(12) United States Patent
Newcomb et al.

(10) Patent No.: US 9,989,170 B2
(45) Date of Patent: *Jun. 5, 2018

(54) STRAP FOR SUSPENDING WIRES THAT IS RECONFIGURABLE FOR VARIOUS ATTACHMENT SYSTEMS

(71) Applicant: Com Dangles LLC, San Jose, CA (US)

(72) Inventors: David Vance Newcomb, Soquel, CA (US); Glen William Osterhout, Pleasanton, CA (US); Charles H. Reynolds, San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/624,182

(22) Filed: Jun. 15, 2017

(65) Prior Publication Data

US 2017/0284568 A1  Oct. 5, 2017

Related U.S. Application Data

(63) Continuation of application No. 14/754,687, filed on Jun. 30, 2015, now Pat. No. 9,709,192.

(51) Int. Cl.
| | |
|---|---|
| *F16L 3/06* | (2006.01) |
| *F16L 3/14* | (2006.01) |
| *F16B 19/00* | (2006.01) |
| *H02G 3/32* | (2006.01) |
| *B65B 1/00* | (2006.01) |
| *F16L 3/12* | (2006.01) |
| *F16L 3/137* | (2006.01) |
| *F16B 2/08* | (2006.01) |
| *F16B 2/24* | (2006.01) |

(52) U.S. Cl.
CPC .............. *F16L 3/14* (2013.01); *B65B 1/00* (2013.01); *F16B 19/00* (2013.01); *F16L 3/1218* (2013.01); *F16L 3/137* (2013.01); *H02G 3/32* (2013.01); *F16B 2/08* (2013.01); *F16B 2/246* (2013.01)

(58) Field of Classification Search
CPC ... F16L 3/14; F16L 3/133; F16L 3/233; F16L 3/1008; F16L 3/11; F16L 3/1211; F16L 3/137
See application file for complete search history.

(56) References Cited

U.S. PATENT DOCUMENTS

| | | | | |
|---|---|---|---|---|
| 1,966,899 | A * | 7/1934 | McCabe | F16L 3/133 248/62 |
| 2,319,832 | A * | 5/1943 | Trochim | F16L 3/14 248/60 |
| 3,933,377 | A * | 1/1976 | Arrowood | F16L 3/00 248/62 |

(Continued)

*Primary Examiner* — Bradley Duckworth
(74) *Attorney, Agent, or Firm* — Phillip M. Wagner (57) ABSTRACT

A strap assembly which may be attached to an overhead hanger is molded with three components used for suspending wires or pipes from an overhead structure such that the three components may be sold and shipped as a single unit, then singulated by the user to use separately. One component is a strap for forming a saddle to hold wires, pipes, and the like; a second component is a dual-function fastener which may be used to permanently attach the strap to a connector, such as a multifunction clip and temporarily fasten the other end of the strap to itself; a third component is a protective tip which may be pushed onto the end of the hanger. The dual-function fastener may be used alone for other purposes.

19 Claims, 10 Drawing Sheets

(56) References Cited

U.S. PATENT DOCUMENTS

| | | | | |
|---|---|---|---|---|
| 4,655,423 | A * | 4/1987 | Schavilje | B25B 31/00 227/3 |
| 4,936,530 | A * | 6/1990 | Wollar | F16B 2/12 248/68.1 |
| 4,943,016 | A * | 7/1990 | Hennecke | F16L 3/14 248/59 |
| 5,005,789 | A * | 4/1991 | Jones | F16L 3/133 248/58 |
| 5,192,039 | A * | 3/1993 | Williams | F16L 59/135 138/107 |
| 5,303,885 | A * | 4/1994 | Wade | F16L 3/133 24/543 |
| 5,354,021 | A * | 10/1994 | Farrell | F16L 3/233 24/16 PB |
| 6,325,338 | B1 * | 12/2001 | Del Re | F16L 3/14 248/68.1 |
| 6,386,489 | B1 * | 5/2002 | Gretz | F16L 3/233 174/72 A |
| 6,557,805 | B1 * | 5/2003 | Snyder | F16L 3/137 248/60 |
| 6,640,393 | B2 * | 11/2003 | Wendle | B65D 63/1027 24/16 PB |
| 6,672,545 | B1 * | 1/2004 | Persing | F16L 3/1211 248/58 |
| 6,945,501 | B2 * | 9/2005 | Thompson | F16L 3/133 248/304 |
| 7,083,151 | B2 * | 8/2006 | Rapp | F16L 3/133 24/16 PB |
| 7,185,399 | B2 * | 3/2007 | Logan | F16L 3/233 24/16 PB |
| 8,876,066 | B1 * | 11/2014 | Richards | F16B 33/002 248/55 |
| 9,091,372 | B2 * | 7/2015 | Lacour | F16L 3/133 |
| 9,709,192 | B1 * | 7/2017 | Newcomb | F16L 3/14 |
| 2003/0108130 | A1 * | 6/2003 | Tucker | B28B 23/0056 375/345 |
| 2006/0138286 | A1 * | 6/2006 | Connolly | F16L 3/11 248/62 |
| 2007/0205335 | A1 * | 9/2007 | Huebner | F16L 3/133 248/58 |
| 2007/0272806 | A1 * | 11/2007 | Kim | F16L 3/1008 248/62 |
| 2010/0038494 | A1 * | 2/2010 | Osborn | F16L 3/1218 248/58 |
| 2012/0074673 | A1 * | 3/2012 | Henriksson | F16L 3/137 280/728.2 |
| 2013/0075540 | A1 * | 3/2013 | Hammond | F16L 3/1008 248/62 |
| 2013/0193279 | A1 * | 8/2013 | Tanaka | F16B 21/086 248/74.3 |
| 2016/0208979 | A1 * | 7/2016 | Lange | F16L 59/135 |

* cited by examiner

STRAP FOR SUSPENDING WIRES THAT IS RECONFIGURABLE FOR VARIOUS ATTACHMENT SYSTEMS

CROSS REFERENCE TO RELATED APPLICATIONS

This application is a continuation of U.S. patent application Ser. No. 14/754,687 filed Jun. 30, 2015, incorporated herein by reference in its entirety. This application is also related to abandoned commonly-owned U.S. patent application Ser. No. 13/083,393 submitted Apr. 8, 2011, by David Newcomb et al, which application is incorporated herein in its entirety. This application is also related to abandoned commonly-owned U.S. patent application Ser. No. 13/794,770, which is a Continuation in Part of application Ser. No. 13/083,393, submitted Mar. 11, 2013 by David Newcomb et al, which application is incorporated herein in its entirety.

BACKGROUND

In the construction of buildings, both residential and commercial, it is very common to have runs of several long items throughout the structure. Examples of the items include cables, UTP phone line, coax cable, CAT5, CAT6, electrical wire or other electrically-conducting wire, pipes, tubing, conduit, and fiber optic cables. Whether various supported elements mayor may not be mixed in a common support structure is a matter for building codes; it is not a limitation of the instant invention.

Electrical wire is high voltage, and typically run from a junction box to various end points. In some areas low voltage communications wires and electrical power wires may be commonly supported provided they are separated. For example, the California Electrical Code 800.133(A)(1) allows the two to be mixed specifying they are " . . . separated from all of the conductors of communications circuits by a permanent barrier or listed divider."

Particularly in a commercial building, there may be a large number of wires in a common run. At certain points a subset of the wires may go in a different direction, thus the number of wires in a given segment can be very variable. Building codes generally require devices which restrain a bundle of communications wires to be no more than five feet apart. Requirements for spacing and clearance, such as space under a ceiling or raised floor, are generally given by the document ANSI/TIA/EIA 569-A. The document states that a suspension system may be located above or below a ceiling, within an access floor, in a plenum or non-plenum space. If a non-metallic product is located in a plenum area, it shall be plenum rated. According to Underwriters Laboratories Inc. ("UL"), the portion of the NEC® that defines the requirements of a cabling pathway is found in Section 300 of the NEC®.

There are many devices available in the prior art for suspending communications wires. Many are preconfigured for the number of wires they are designed to carry. A suspension device having a predetermined capacity is problematic in that a builder may need to carry an inventory of various sizes to be able to always have the right one on hand during a given project. Prior art solutions make it difficult to modify (add, remove, reroute) a supported wire bundle.

Just as there is an extreme variety of construction types, there is a variety of apparatus for attaching suspension devices to an overhead structure. What is lacking is a convenient way for a given suspension device to be connected which accommodates a variety of connection methods. A contractor may be involved in a plurality of construction jobs, and would prefer to have all required piece parts available in a single kit. This would lower inventory as well as training costs.

What is needed is an inexpensive device for holding bundled wires that is fast and easy to install, and which can accommodate a range in the number of wires carried, with flexibility as to how it can be attached to a structure with a minimum of different piece parts required for pre-installation inventory and which may be quickly configured at an installation point. It would be advantageous for the system to conveniently permit modifying or rerouting a portion of a supported wire bundle after initial installation.

SUMMARY

As will be disclosed hereinafter, the present invention is useful for suspending a variety of items. In the interest of clarity and brevity, only wires, such as communication wires, will be described, which is extendable to many other items, such as electrical cable, tubing, and pipes. In the various embodiments, the instant invention comprises a flexible, electrically nonconductive strap which has been molded to include optional accessories into one piece, wherein the accessories be removed from the main body of the strap and used or not used as needed. The strap itself is configured such that it may be attached to a variety of hangers without modification of the strap.

The hanger may be a rigid piece, perhaps embedded in an overhead concrete structure when it is poured. It may also be a wire that has been attached to an overhead member with the wire hanging down. In general, one may visualize the invention as forming a sling for holding the wire(s), which may be attached to a hanger by various means, wherein the sling is a kit comprising removable accessories which may also be used in assembling a complete suspension installation. Included in the one-piece molded kit is a dual-function fastener which permits easy modification without the need to remove any elements of the assembly.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. In some embodiments, the example of holding wires is shown, but a person of ordinary skill in the art will understand that pipe, electrical wire, tubing, and conduit may be held as well.

Figure 1:
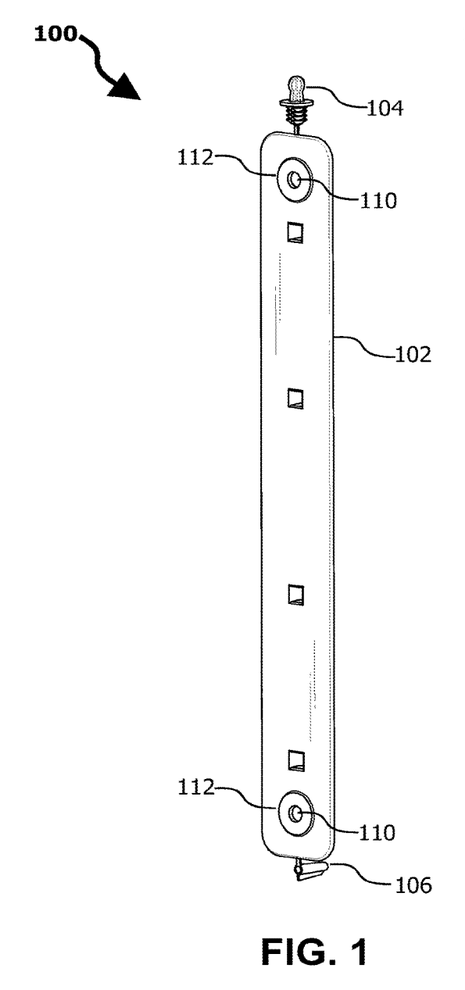
FIG. 1 shows a first side of a strap for holding wires or pipes, including a detachable dual-function fastener and a removable tip piece.
Figure 2:
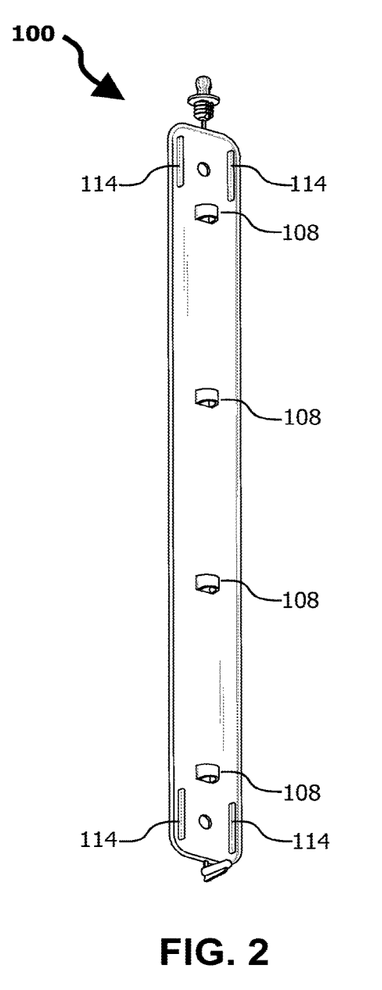
FIG. 2 shows a second side of a strap for holding wires or pipes, including a detachable dual-function fastener and a detachable tip piece, with alignment ridges in view.
Figure 3:
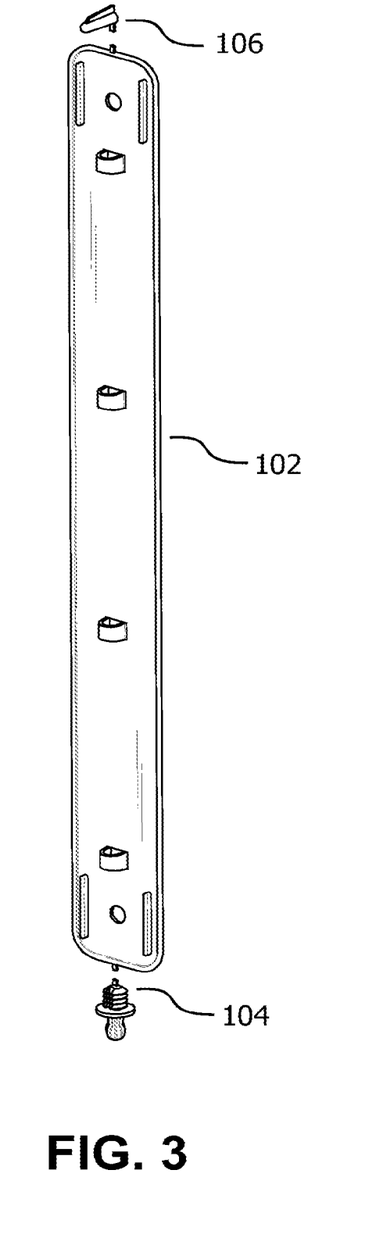
FIG. 3 shows a strap with accessories detached from the main strap body.

Referring to FIG. 1, FIG. 2, and FIG. 3, in the various embodiments a restraining strap assembly 100 comprises a relatively long, narrow flat portion 102, a number of protrusions 108, holes 110 that may be reinforced 112, a removable dual-function fastener 104, and a removable protective tip 106. In some embodiments the items 102, 104, and 106 may be molded together for cost reduction and for convenience in shipping and field use. In some embodiments the items 102, 104, and 106 may be molded separately and delivered as a kit; for simplicity of description we will describe them as a complete single assembly 100. The strap assembly 100 may be made from a nonmetallic, flame resistant material, for example PVC, polypropylene, or ABS plastic, wherein the material satisfies safety requirements for fire resistance and anti-chafing. Alignment ridges 114 may be molded onto the side that would be the outer surface when the flat strap 102 is wrapped around a wire bundle 905, wherein the ridges 114 are parallel to the flat strap 102 long edges and themselves, spaced such that an industry standard multifunction clip 402 may fit between the ridges 114, thereby be restrained from rotating during assembly and use. In some embodiments the ridges 114 are only molded on one end of the strap assembly 100, in other embodiments the ridges 114 are molded on both ends and/or on both sides of the flat strap 102.

Figure 4:
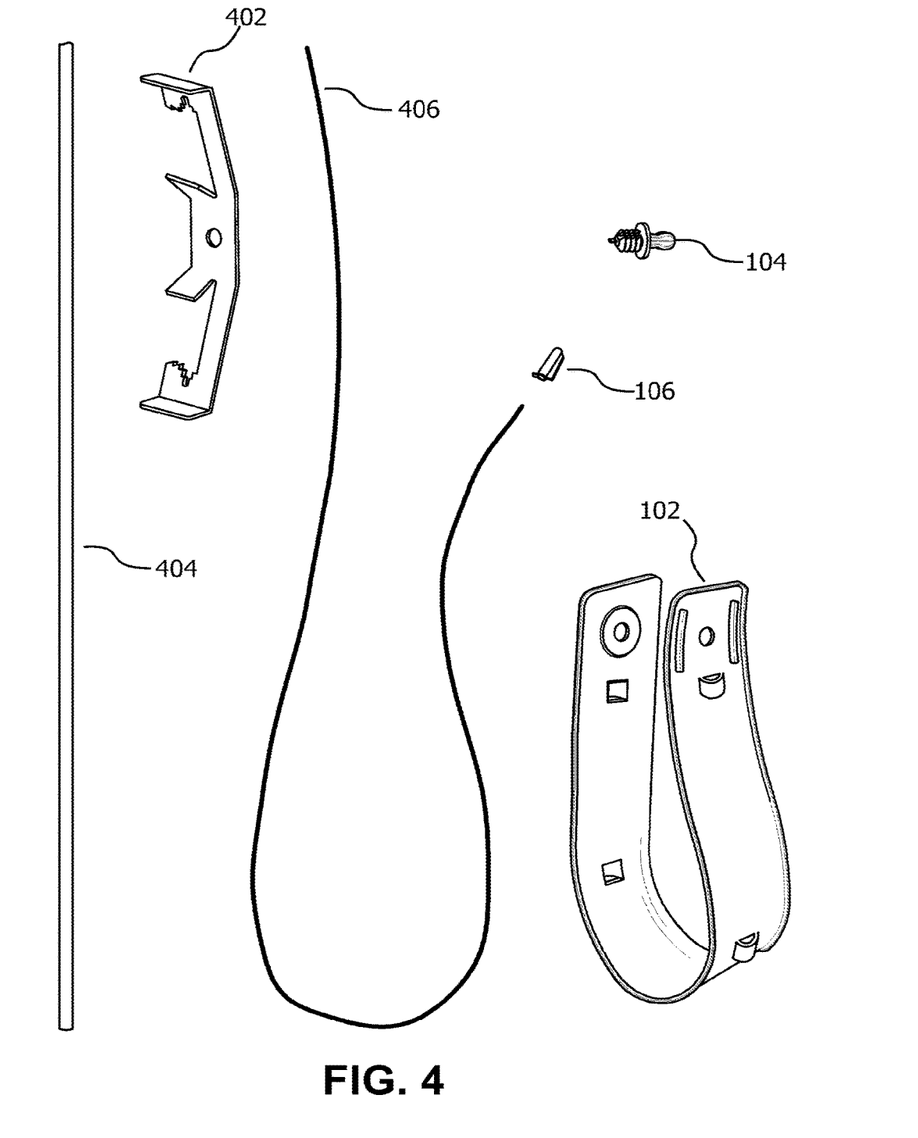
FIG. 4 is various components that may comprise an attachment system.

FIG. 4 illustrates various components that may comprise an apparatus for holding a wire bundle 905. The dual-function fastener 104 and protective tip 106 are shown after being detached from a complete strap assembly 100. Note that either the dual-function fastener 104 or the tip 106 or both or neither may be used during a given assembly. A wire hanger 406 may have a free end inserted into the protective tip 106. In some embodiments the tip 106 is sized for a wire hanger 106, in other embodiments the tip 106 is sized for a rigid hanger 404.

In some installations a rigid piece 404 extends down from an overhead structure, such as concrete. A multifunction clip 402 may be used to connect the strap 102 to a hanger 402, 406.

Figure 5:
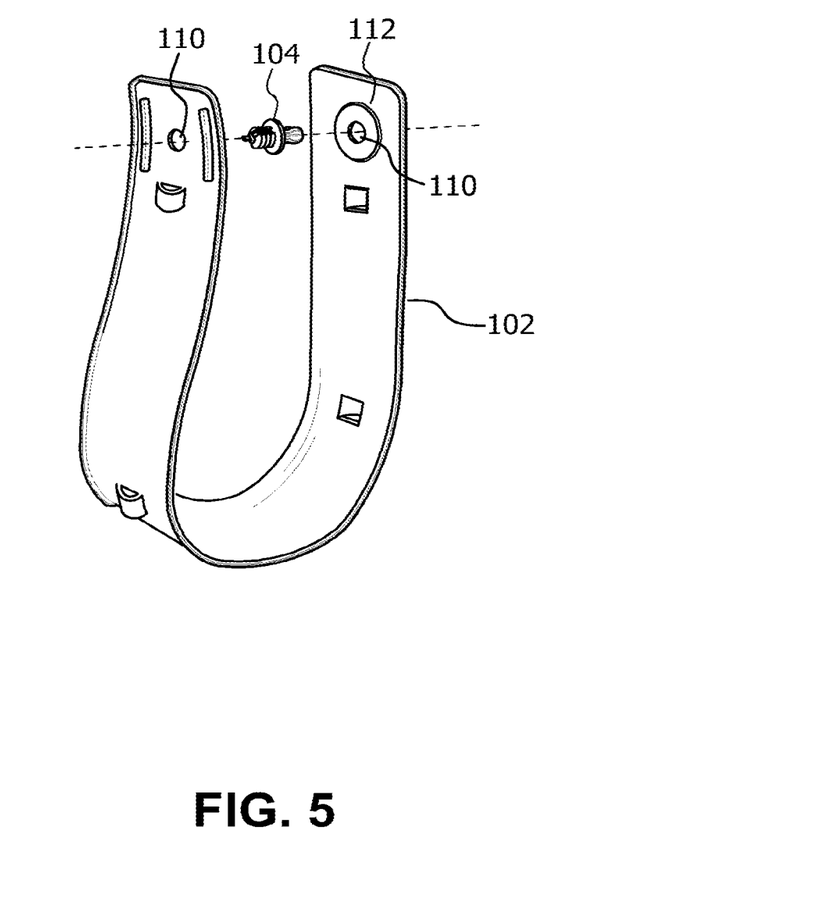
FIG. 5 is an exploded view of a strap system partially assembled, including a dual-function fastener that may be inserted between two opposing ends of the strap to hold the two ends together.

FIG. 5 details the spatial relationship between the holes 110 at each end of the strap 102 and the dual-function fastener 104 when assembled.

Figure 6:
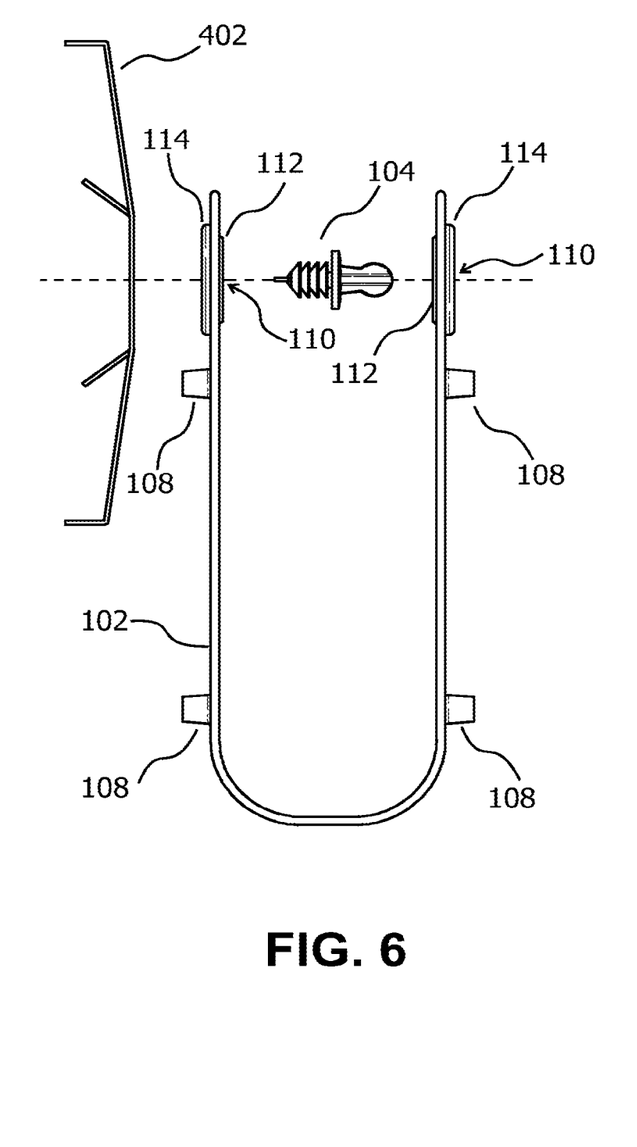
FIG. 6 shows a side view of the assembly of FIG. 5 with a dual-function fastener aligned to hold the two ends of a strap together and fastening an attachment clip to the strap.

FIG. 6 shows the spatial relationship between a multifunction clip 402, flat strap 102 ends, strap holes 110 and the dual-function fastener 104. The holes 110 may be reinforced by additional thicknesses 112. Note the ridges 114 which may be on the same side of the flat strap 102 end to restrain the multifunction clip 402 from rotating. An example of the multifunction clip 402 is CADDY Erico part number 4Z34, available from Erico Corporation in Solon, Ohio. There are many other suitable and similar multifunction clips 402 available from a variety of vendors, which the instant invention may accommodate.

Figure 8:
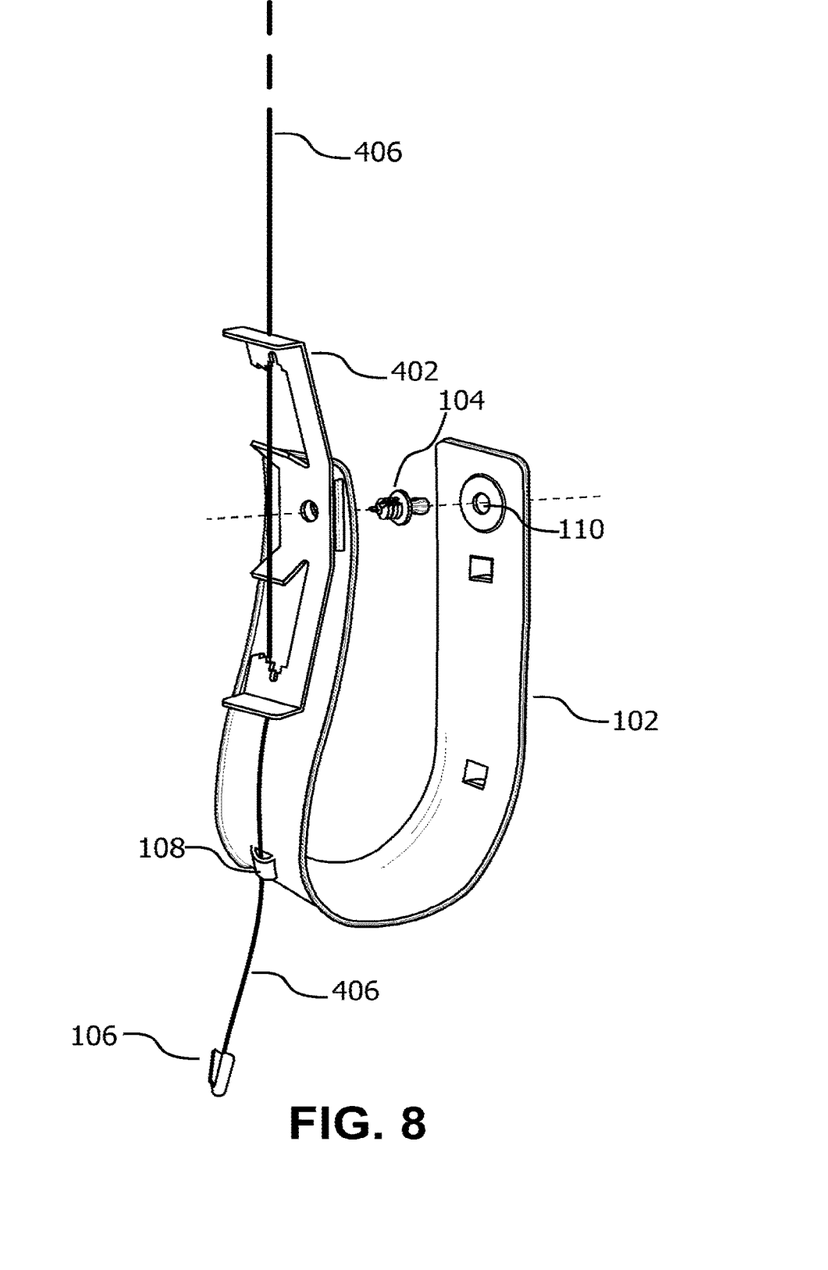
FIG. 8 is an optional assembly for holding wires or pipes, including attachment to a flexible piece descending from an overhead structure.

Looking to FIG. 8, protrusions 108 are available for an optional assembly method wherein a flexible vertical hanger 406, for example wire, may be routed through one or more of the protrusions 108. In some construction strategies the optional tip 106 is removed from the strap assembly 100 and pushed onto the end of a wire hanger 406 to reduce scratching. In some construction strategies the strap portion 102 is partially preassembled with a wire 406 routed through the protrusions 108, the tip pushed onto the bottom end of the wire. The top end of the wire may be attached to an overhead structure. A series of such subassemblies may be attached along a desired route below an overhead structure, then a wire bundle 905 deployed underneath, and finally the bundle 905 held to the level of the preassembled flat strap 102, which is then pulled around the wire bundle 905 until the holes 110 on opposing ends of the flat strap 102 are aligned with the dual-function fastener 104 between the ends. The ends may be pushed together such that the dual-function fastener 104 is secured to both ends of the flat strap 102.

Figure 10:
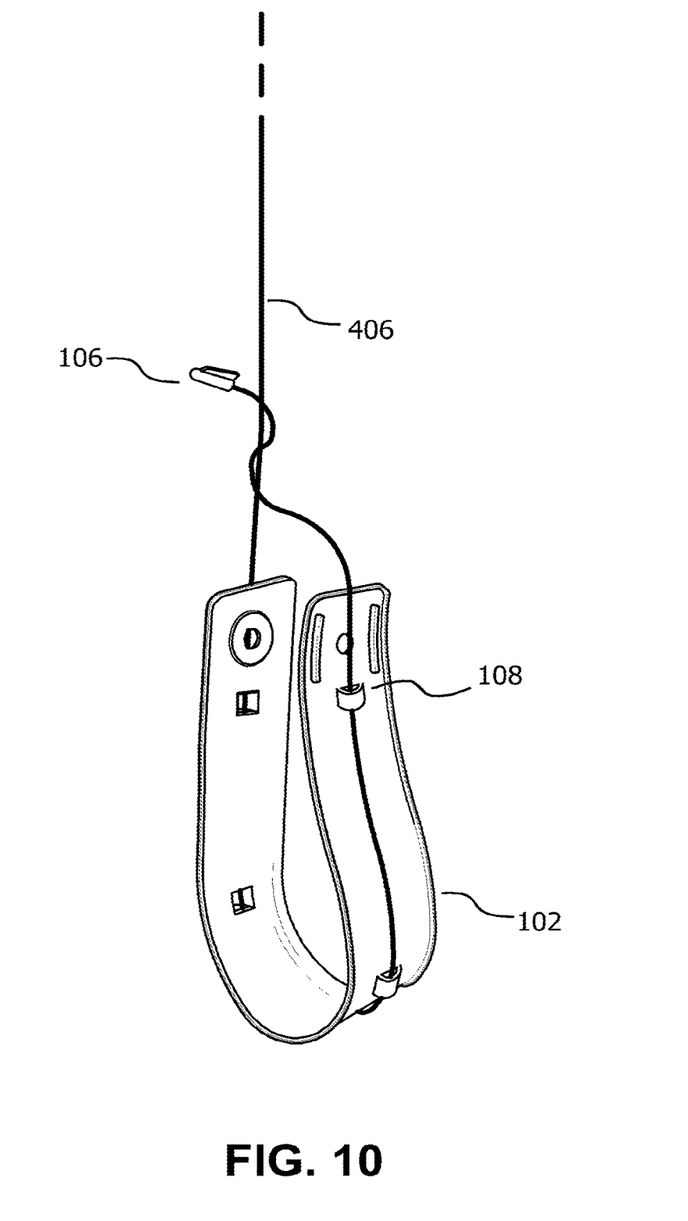
FIG. 10 is another version of an assembly for holding wires or pipes wherein a flexible wire hanger may be routed through restraining protrusions on a strap, then twisted about the vertical descending wire, including a protective tip.

The wire hanger 406 and flat strap 102 assembly in the just-above description may be simply pulled around the bundle 905 and a free end of the hanger 406 twisted around itself, thereby holding the free end to the portion of the wire 406 descending from the overhead structure. This configuration is illustrated in FIG. 10.

Figure 7:
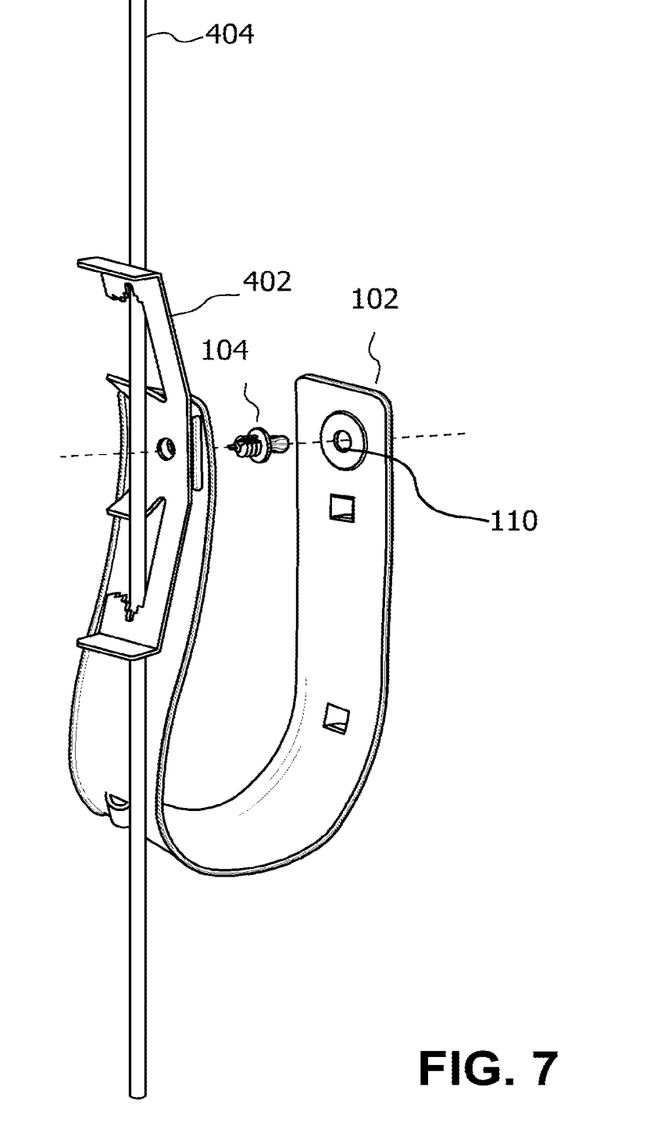
FIG. 7 is an optional assembly for holding wires or pipes, including attachment to a rigid piece descending from an overhead structure.

As illustrated by the example in FIG. 7, a rigid hanger piece 404 may descend from an overhead structure, with the multifunction clip 402 engaging the hanger 404 while also attached to the strap 102 by the dual-function fastener 104. In this configuration, the ribbed end of the dual-function fastener 104 may be pushed through a first hole 110 and through a matching hole in the multifunction clip 402, the strap 102 wrapped around a wire bundle 905, then the round end of the dual-function fastener 104 pushed through a second hole 110 on the other end of the flat strap 102.

Alternatively, similar to the configuration of FIG. 7, the flat strap 102 may be attached to a wire hanger 406 using the multifunction clip 402, as illustrated by FIG. 8.

The protrusions 108 may be formed in a variety of ways in practicing the invention. In one embodiment the protrusions 108, the flat strap 102, the dual-function fastener 104, and the tip 106 are molded as a single solid piece. In other embodiments the flat portion of the strap assembly 100 is processed with a male punch and a matching female die (not shown) such that a protrusion 108 is formed by stretching the punched-out material into the die. There may be any number of protrusions 108 on a flat strap 102. In some embodiments the strap assembly 100 is made available in a variety of lengths, to accommodate more or fewer wires in a bundle 905. In some embodiments the strap assembly 100 is provide individually, in other embodiments the strap assembly 100 is shipped along with a hanger 404 or 406 and may optionally have the strap assembly 100 and wire hanger 406 provided preassembled. In some embodiments the strap assembly 100 is shipped with a multifunction clip 402 pre-attached to one end of the strap 102. Other configurations will be obvious to one of ordinary skill in the art.

Figure 9:
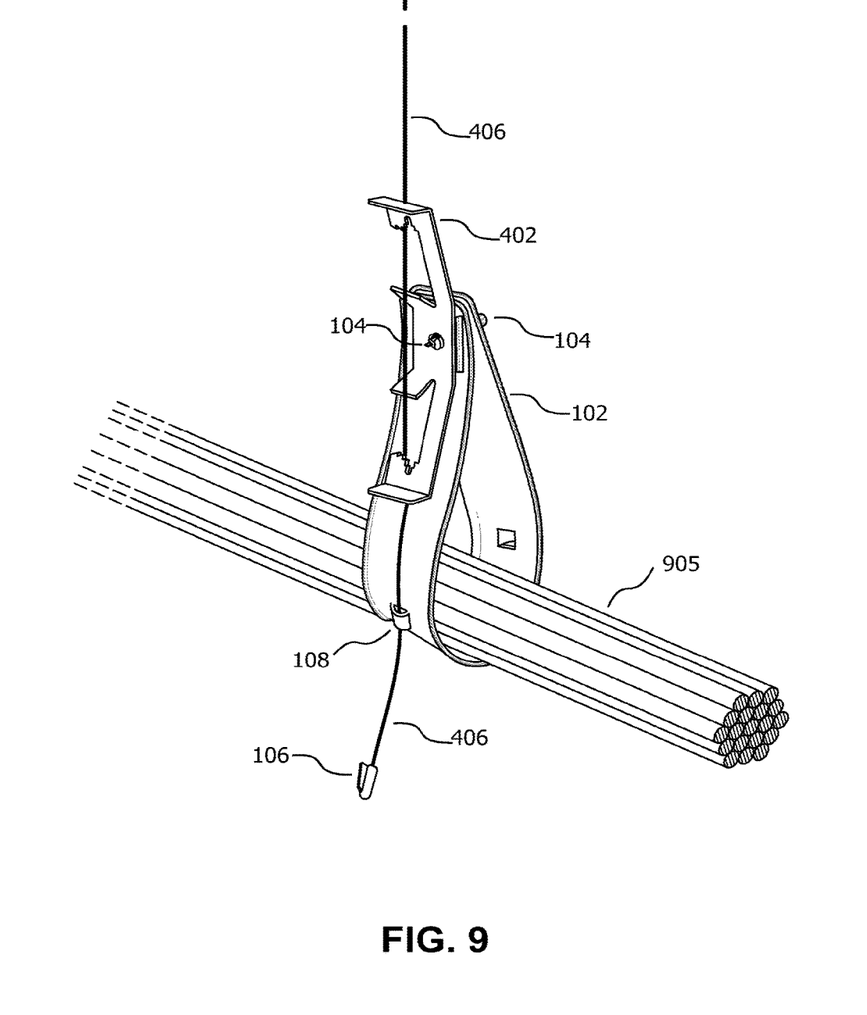
FIG. 9 is similar to FIG. 8, including a suggestion of how a bundle of wires may be held within a strap.

In FIG. 8, FIG. 9, and FIG. 10 the overhead structure may be a ceiling or beam. A wire hanger 406 may be connected to the overhead structure using an Erico CADDY #4H24 from Erico Corporation in Solon, Ohio. In another example the overhead structure may be a concrete ceiling and the hanger 406 connected to the structure using a Ramset #SDC125 from ITW Ramset, Glendale Heights, Ill.

Figure 11:
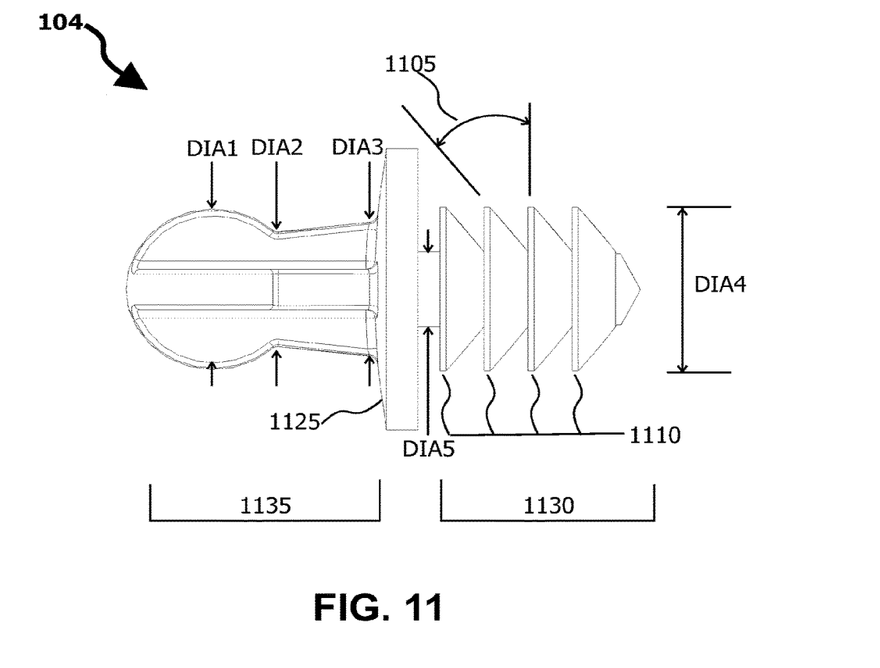
FIG. 11 is a detailed view of a dual-function fastener.

Looking to FIG. 11, the dual-function fastener 104 is detailed. The dual-function fastener 104 comprises an end 1130 comprising a number of flexible ribs 1110, wherein the ribs 1110 are relatively thin and angled back 1105 towards the middle. The diameter DIA4 of the ribs 1110 may be larger than a matching hole 110 on the strap 102 such that the dual-function fastener 104 may have the ribbed end 1130 pushed through a hole 110.

The other end of the dual-function fastener 104 may be formed to include a bulbous or spherical knob 1135. The knob 1135 may be molded with a size DIA1 that is slightly greater than the hole 110 of the flexible strap 102. A smaller area of a diameter DIA2 may approximate the size of a receiving hole, for example the hole 110 of the strap 102. A taper enlargement of size DIA3 may be provided to minimize movement within the hole 110. A flange 1125 may provide a barrier between what is being held (not shown) by the ribbed end 1130 and the knob 1135.

The dual-function fastener 104 enables an assembly that may easily be modified after the fact. That is, one may have a run of several locations where wires 905 are bundled, then at a later time easily open up the end of the strap 102 being held by the dual-function fastener 104 knob 1135 in order to add, remove, or reroute one of more wires 90S, then simply snap the strap 102 closed on the knob 1135, while the ribbed end 1130 stays connected to its load, for example the other end of the strap 102 and a multifunction clip 402.

In some embodiments the holes 110 in the strap 102 are 0.25 inches, DIA1 is 0.28 inches, DIA4 is 0.30 inches, and the flange 1125 is 0.70 inches. In one embodiment the ribs 1110 are slanted 38 degrees 1105. These are simply examples of a given embodiment; other sizes will be understood to be within the scope of the claims of the invention.

The dual-function fastener 104 is shown and described as part of the assembly 100, however the dual-function fastener 104 may be used not as part of the assembly 100 anywhere one desires a fastener providing a permanent attachment at one end and a removable attachment at the other end.

Figure 12:
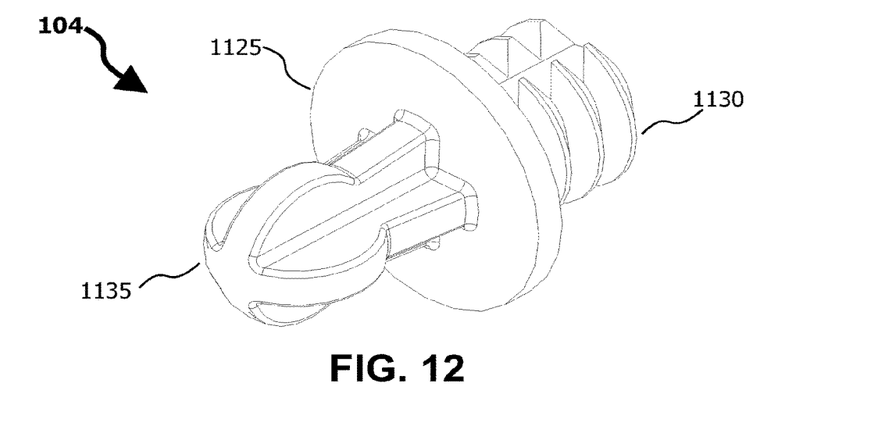
FIG. 12 is a perspective view of a dual-function fastener.

FIG. 12 is a perspective view of the dual-function fastener 104 for clarity.

The preceding description of the disclosed embodiments is provided to enable any person skilled in the art to make and use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An apparatus for suspending items under an overhead supporting structure, comprising:
   a single piece strap assembly comprising a strap for receiving the items, a first hole at a first end of the strap, and a second hole at a second end of the strap;
   a dual-function fastener integrally formed with the strap assembly, the dual-function fastener having a spherical knob configured to connect to the first end through the first hole and a plurality of flexible ribs configured to connect to the second end through the second hole; and
   a protective tip integrally formed with the strap assembly, the protective tip configured for detachment from the strap assembly and for attachment to an end of a wire,
   wherein the dual-function fastener may be removed from the strap assembly and inserted into the first hole and the second hole with a first side of the strap at the first end facing toward the first side of the strap at the second end, thereby forming a saddle against which the items may be supported.

2. The apparatus according to claim 1, wherein the items comprise communication wires.

3. The apparatus according to claim 1, wherein the items comprise wires for conducting electrical power.

4. The apparatus of claim 1, wherein the strap assembly is made from a nonmetallic, flame resistant material.

5. An apparatus for suspending items from a supporting structure, comprising:
   a flexible strap formed as a single piece, comprising:
      a flat portion having a first end and a second end opposite the first end,
      the flat portion formed with a first aperture near the first end and a second aperture near the second end;
      a plurality of protrusions extending outward from a first side of the flat portion, the plurality of protrusions positioned between the first aperture and the second aperture, each of the protrusions formed as an integral part of the flexible strap, and each of the protrusions configured to admit a wire hanger between the protrusion and the first side; and
      an alignment ridge extending outward from the first side near the first aperture;
   a tip piece; and
   a dual-function fastener, comprising:
      a spherical knob attached to a flange, the spherical knob configured to connect to the first end of the flexible strap through the first aperture; and
      a flexible rib attached to the flange on a side opposite the spherical knob, the flexible rib configured to connect to the second end of the flexible strap through the second aperture.

6. The apparatus of claim 5, further comprising a second alignment ridge extending outward from the first side of the flexible strap near the second aperture.

7. The apparatus of claim 5, wherein the alignment ridge is positioned to contact an edge of a multifunction clip placed against the first side.

8. The apparatus of claim 5, wherein the alignment ridge is parallel to a longitudinal edge of the flexible strap.

9. The apparatus of claim 5, further comprising a reinforcement surrounding the first aperture.

10. The apparatus of claim 5, wherein the tip piece is formed as an integral part of the flexible strap.

11. The apparatus of claim 5, wherein the dual-function fastener is formed as an integral part of the flexible strap.

12. The apparatus of claim 5, wherein the tip piece includes a closed first end and a second end adapted to admit an end of a wire hanger.

13. The apparatus of claim 5, wherein the dual-function fastener comprises more than one flexible rib.

14. The apparatus of claim 5, wherein the flexible rib is tilted away from an end of the dual-function fastener nearest the flexible rib.

15. The apparatus of claim 5, further including a multi-function clip.

16. The apparatus of claim 15, wherein the dual-function fastener attaches the multifunction clip to the flexible strap.

17. The apparatus of claim 5, further comprising a saddle formed by passing the spherical knob through the first aperture in the flexible strap and passing the flexible rib through the second aperture.

18. The apparatus of claim 5, further comprising the wire hanger.

19. The apparatus of claim 5, further comprising a rigid hanger.

\* \* \* \* \*